April 15, 1941.  A. EDMONSTON  2,238,312

SWITCH ASSEMBLY FOR PRESSURE INDICATORS

Filed Aug. 4, 1940

INVENTOR.
ALLIE EDMONSTON
BY
ATTORNEY.

Patented Apr. 15, 1941

2,238,312

UNITED STATES PATENT OFFICE 2,238,312

SWITCH ASSEMBLY FOR PRESSURE INDICATORS

Allie Edmonston, Wellston, Mo., assignor to Air Pressure Indicators, Inc., St. Louis, Mo., a corporation of Missouri Application August 4, 1940, Serial No. 351,343

7 Claims. (Cl. 200—58)

My invention relates to a switch assembly for pressure indicators, particularly of the character shown in my previous Patent No. 2,179,255, dated November 7, 1939. I have simplified and condensed the switch assembly structure illustrated in my said previous patent, and have insulated the metal ball and its associated parts from contact with the inner, metal surface of the tube in which they are contained, and have formed all of the screwthreaded portions out of metal. This makes for a more durable switch assembly structure of a more simplified form, and is equally as advantageous as the switch assembly structure shown and described in my earlier patent. I have provided the portion of the switch assembly which is in contact with the inner tube of the tire with rounded surfaces, thereby avoiding any possibility of injury to the inner tube. Except for these changes, all of the other elements are substantially identical with those shown in my said previous patent.

Figure 1:
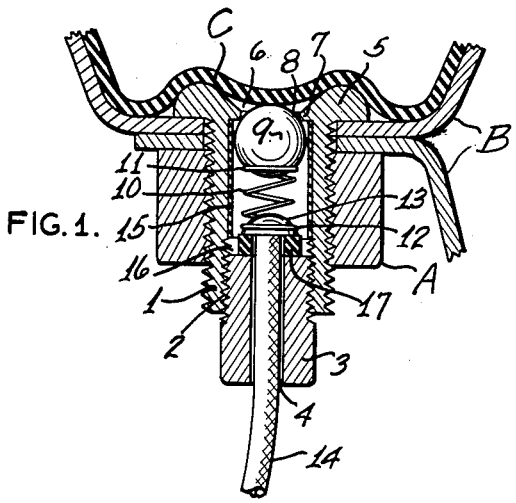
Fig. 1 is a cross-sectional view showing my switch assembly device mounted in the rim of a wheel.
Figure 2:
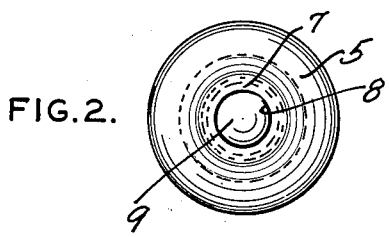
Fig. 2 is a top plan view of my switch assembly device.

In the drawing, A indicates the usual rim of an automobile wheel, B the tire-supporting members, and C the inner tube contained within the tire casing (not shown) mounted on the rim A. These are all part of a removable wheel structure.

My switch assembly structure comprises an externally screwthreaded, tubular member 1, which is also provided with internal screwthreads 2 at the outer end thereof to receive a cylindrical, screwthreaded plug 3 having a longitudinal opening 4 extending therethrough. The tubular member 1 at its inner end has an outwardly flared portion 5 providing a cup-shaped, circular depression 6. The portion 5 extends inwardly to provide a shoulder 7 which overhangs the tubular member 1. An aperture 8 is provided in the cup-shaped depression 6. A metal ball 9 is located in the tubular member 1 adjacent the inner end thereof, the diameter of said ball being larger than the diameter of the aperture 8. The ball 9, when in the position shown in Fig. 1, contacts with the metal shoulder 7 of the cup-shaped depression 6. A coil spring 10 has a loop 11 at its inner end in which the metal ball 9 is adapted to seat. Another loop 12 on the spring 10 fits over the semi-spherical end 13 of a metal conductor enclosed within the insulation 14, and passing through the longitudinal opening 4 in the plug 3. A tubular insulating member 15 is frictionally engaged with the inner tubular member 1 and surrounds approximately one-half of the inner surface length of the tubular member 15. The upper end of the insulating, tubular member 15 abuts against the inner sides of the shoulder 7, and at its lower end abuts against one side of a metal, threaded plug 16. Secured within an aperture in the plug 16 is an insulating washer 17 against which the flat face of the semi-spherical end 13 of the conductor (not otherwise shown) is adapted to rest.

As shown in Fig. 1, the metal ball 9, spring 10, and the semi-spherical end 13 of the conductor are in contact, thus closing the circuit and causing a light (not shown) on the automobile dashboard to light up, thus indicating an under air-pressure in the tube C. When the tube C is properly inflated, the ball 9 is forced away from the shoulder 7, thus breaking the contact, and the dashboard light is not operated.

This same type of construction of the switch assembly applies to the over, as well as the under, inflation of switch assembly units. It will be noted that by the outwardly flared portion 5 no surface is presented to the inner tube C which would tend to cause any mutilation or injury to said inner tube.

By screwing the screwthreaded plug 3 inwardly or outwardly within the tubular member 1, more or less pressure is required to unseat the ball 9 which is held in its outward position by the coil spring 10 located between said ball and the inner end of said plug 3. In the position shown in Fig. 1, air in the inner tube C in excess of a predetermined number of pounds is required to unseat the ball 9. If the plug 3 is rotated so as to tend to move it outwardly from the tubular element 1, the amount of pressure required to unseat the ball 9 is diminished. Thus by rotating the plug 3, causing it to move inwardly or outwardly of the tubular member 1, the amount of air pressure in the inner tube C may be predetermined to cause the unseating of the ball 9.

I claim:

1. A switch assembly comprising a tubular member having an outwardly flared, apertured, cup-shaped end provided with a shoulder adjacent said cup-shaped end, a metal ball arranged within said tubular member and of a diameter larger than said aperture in said end, a metal spring in contact with said metal ball, a metal conductor in contact with said spring, an insulating element surrounding said ball, spring, and conductor, and means for pressing said ball away from contact with the metal portion of said tubular member.

2. A switch assembly comprising a tubular member having an outwardly flared, apertured, rounded, cup-shaped end provided with a shoulder adjacent said cup-shaped end, a metal ball arranged within said tubular member and of a diameter larger than said aperture in said end, a metal spring in contact with said metal ball, a metal conductor in contact with said spring, an insulating element surrounding said ball, spring, and conductor, and means for pressing said ball away from contact with the metal portion of said tubular member.

3. A switch assembly comprising a tubular member having an outwardly flared, apertured, rounded, cup-shaped end provided with a shoulder adjacent said cup-shaped end, a metal ball arranged within said tubular member and of a diameter larger than said aperture in said end, a metal spring in contact with said metal ball, a metal conductor in contact with said spring, an insulating element enclosed within said tubular element and surrounding said ball, spring, and conductor, and means for pressing said ball away from contact with the metal portion of said tubular member.

4. A switch assembly comprising a tubular member having an outwardly flared, apertured, cup-shaped end provided with a shoulder adjacent said cup-shaped end, a metal ball arranged within said tubular member and of a diameter larger than said aperture in said end, a metal spring in contact with said metal ball, a loop in one end of said spring to provide a seat for said ball, a metal conductor in contact with said spring, an insulating element surrounding said ball, spring, and conductor, and means for pressing said ball away from contact with the metal portion of said tubular member.

5. A switch assembly comprising a tubular member having an outwardly flared, apertured, cup-shaped end provided with a shoulder adjacent said cup-shaped end, a metal ball arranged within said tubular member and of a diameter larger than said aperture in said end, a metal spring in contact with said metal ball, a loop in one end of said spring to provide a seat for said ball, a metal conductor in contact with said spring and having a semi-spherical end against which said spring is seated, an insulating element surrounding said ball, spring, and conductor, and means for pressing said ball away from contact with the metal portion of said tubular member.

6. A switch assembly comprising a tubular member having an outwardly flared, apertured, cup-shaped end provided with a shoulder adjacent said cup-shaped end, a metal ball arranged within said tubular member and of a diameter larger than said aperture in said end, a metal spring in contact with said metal ball, a loop in one end of said spring to provide a seat for said ball, a metal conductor in contact with said spring and having a semi-spherical end against which said spring is seated, an insulating washer beneath said semi-spherical end, an insulating element surrounding said ball, spring, and conductor, and means for pressing said ball away from contact with the metal portion of said tubular member.

7. A switch assembly comprising a tubular member having an outwardly flared, apertured, cup-shaped end provided with a shoulder adjacent said cup-shaped end, a metal ball arranged within said tubular member and of a diameter larger than said aperture in said end, a metal spring in contact with said metal ball, an adjustable, threaded, metal conductor in contact with said spring located within said tubular member, an insulating element surrounding said ball, spring, and conductor, and means for pressing said ball away from contact with the metal portion of said tubular member.

ALLIE EDMONSTON.